United States Patent
Shurvinton et al.

(10) Patent No.: US 7,006,823 B2
(45) Date of Patent: Feb. 28, 2006

(54) APPARATUS AND METHOD OF MEASURING INTERFERENCE

(75) Inventors: William Shurvinton, Hook (GB); Christopher Hancock, Winchester (GB)

(73) Assignee: Nokio Corporation, Espoo (FI)

( * ) Notice: Subject to any disclaimer, the term of this patent is extended or adjusted under 35 U.S.C. 154(b) by 60 days.

(21) Appl. No.: 10/344,240

(22) PCT Filed: Aug. 9, 2001

(86) PCT No.: PCT/GB01/03601

§ 371 (c)(1),
(2), (4) Date: Aug. 19, 2003

(87) PCT Pub. No.: WO02/15444

PCT Pub. Date: Feb. 21, 2002

(65) Prior Publication Data

US 2004/0102189 A1 May 27, 2004

(30) Foreign Application Priority Data

Aug. 11, 2000 (GB) .................................... 0019852

(51) Int. Cl.
*H04Q 7/20* (2006.01)
*H04L 1/00* (2006.01)
(52) U.S. Cl. .................. 455/422.1; 455/446; 455/447; 375/346; 375/347
(58) Field of Classification Search ........ 455/436–440, 455/442, 446–447, 450, 452.1, 452.2, 62, 455/63.1, 422.1; 370/321–322, 329; 375/260, 375/342, 346–347
See application file for complete search history.

(56) References Cited

U.S. PATENT DOCUMENTS

| | | | | |
|---|---|---|---|---|
| 5,369,785 A | | 11/1994 | Korhonen et al. | |
| 5,812,947 A | * | 9/1998 | Dent | 455/427 |
| 5,828,948 A | | 10/1998 | Almgren et al. | |
| 5,966,657 A | * | 10/1999 | Sporre | 455/425 |
| 6,023,459 A | * | 2/2000 | Clark et al. | 370/329 |
| 6,157,811 A | * | 12/2000 | Dent | 455/12.1 |
| 6,223,031 B1 | * | 4/2001 | Naslund | 455/423 |
| 6,351,643 B1 | * | 2/2002 | Haartsen | 455/450 |
| 6,377,636 B1 | * | 4/2002 | Paulraj et al. | 375/346 |
| 6,470,195 B1 | * | 10/2002 | Meyer | 455/562.1 |
| 6,553,234 B1 | * | 4/2003 | Florea | 455/447 |
| 2002/0002052 A1 | * | 1/2002 | McHenry | 455/447 |
| 2002/0027957 A1 | * | 3/2002 | Paulraj et al. | 375/267 |

OTHER PUBLICATIONS

Patent Abstracts of Japan, vol. 012, No. 449, Nov. 25, 1988 & JP 63 177630.

* cited by examiner

*Primary Examiner*—Binh K. Tieu
(74) *Attorney, Agent, or Firm*—Squire, Sanders & Dempsey LLP

(57) ABSTRACT

A receiver comprising means for receiving a first plurality of signals at different frequencies at substantially the same time; and means for comparing a wanted signal at a first frequency with at least one other signal at a frequency similar to that of said wanted signal to provide a measure of interference provided by said at least one other signal.

13 Claims, 3 Drawing Sheets

APPARATUS AND METHOD OF MEASURING INTERFERENCE

FIELD OF INVENTION

The present invention relates to a method and apparatus for measuring interference, in particular but not exclusively, for use within a cellular telecommunications network.

BACKGROUND TO INVENTION

In known wireless cellular telecommunications networks, an area covered by the network is divided into a plurality of cells. Each of these cells has a base station which is arranged to transmit signals to and receive signals from mobile stations located in the cell associated with the respective base station. Mobile stations will be in active communication with the base station associated with the cell in which the mobile station is located.

Each base transceiver station is, in an example of the GSM (Global System for Mobile Communications) standard, arranged to receive N frequency channels out of a possible 125 frequency channels $F_1 \ldots F_{125}$ available. The total bandwidth occupied by the 125 frequency channels is 25 MHz which means that each frequency channel has a bandwidth of 200 kHz. Other bandwidths between 4.8 and 30 MHz exist. Each channel is divided into frames each of which are further sub-divided into time slots. The GSM standard is a time division multiple access (TDMA) system and accordingly different mobile stations will be allocated different time slots. The base transceiver station will therefore receive signals from different mobile stations in different time slots using the same frequency channel. N is usually less than 125. Each base station uses different frequencies to transmit to the mobile stations. Again 125 channels are available for the transmission of signals by the base station. N channels are also used out of the available 125 channels for transmission by the base station. The frequency used to transmit to a mobile station is generally separated by a constant value from the frequency used by the mobile station to transmit to the base station. In the following, reference is being made to traffic channels.

As a cell is served by a specific base station, all mobile stations within the cell transmit and receive signals at frequencies which have been allocated to the associated base station. A set of N transmit frequencies and a set of N receive frequencies are allocated to base stations and mobile stations.

Each set of frequencies used in a particular cell need to be different from the set of frequencies used in an adjacent or neighboring cell. This is to avoid co-channel interference. For example, if a first cell used a frequency set comprising frequencies $F_1$, $F_4$, $F_7$ then all adjacent cells would use frequencies other than $F_1$, $F_4$, $F_7$.

With GSM there are 125 frequency channels available, as mentioned previously, which means that there will need to be the same frequency channel allocated to more than one cell within the network. The cells with identical frequency sets could be a large distance apart, for example in the countryside where there tends to be fewer mobile stations simultaneously requesting service. Conversely, the cells with identical frequency sets could be a very small distance apart, for example in a major city centre where there tends to be a large number of mobile stations simultaneously requesting service. The neighboring cells which are allocated different frequency channel sets are arranged together in clusters.

In areas where there is a large number of mobile users all trying to communicate with the base station at the same time, for example in major conurbations, there is a need for a correspondingly large number of frequencies to be allocated to each cell, in other words there is a need for a large frequency channel set to be associated with each heavily used cell. This is because many mobile users require service from each base station at substantially the same time. Accordingly frequency reuse patterns are much tighter. That is cells using the same frequency are relatively close together. Additionally, channels of a similar frequency are likely to be present in adjacent cells leading to adjacent channel interference.

As the number of mobile users increases and the size of cells have been made smaller, adjacent channel interference and co channel interference has began to becomes more problematic. This is especially the case where the network is synchronized and cyclic frequency hopping is in use. This is because one user will be effected by the same interferer at all times whereas if synchronization and cyclic frequency hopping were not in use, the interferer would be randomly spread amongst all the users.

To mitigate co channel interference, the networks are currently designed to have sparse reuse of frequency. This means that the distance between cells which are allocated the same frequency channels are relatively long. This reduces interference within the network and also means that adjacent channel interference is not generally problematic. However this does not allow the full capacity of networks to be realised and as the number of subscribers expands and the size of cell reduces, this strategy is disadvantageous.

SUMMARY OF INVENTION

It is therefore the aim of embodiments of the present invention to achieve a higher capacity.

According to a first aspect of the present invention, there is provided a receiver comprising means for receiving a first plurality of signals at different frequencies at substantially the same time; and means for comparing a wanted signal at a first frequency with at least one other signal at a frequency similar to that of said wanted signal to provide a measure of interference provided by said at least one other signal.

According to a second aspect of the present invention, there is provided a network planner for controlling the frequencies used by at least one network element, said network planner controller being arranged to use information provided by at least one network element relating to the interference at said network element between at least one desired signal and at least one unwanted signal at a frequency similar to that of said wanted signal, the network planner being arranged to control the frequencies used by at least one network element in accordance with said information.

According to a third aspect of the present invention, there is provided a method comprising the steps of receiving a first plurality of signals at different frequencies at substantially the same time; and comparing a wanted signal at a first frequency with at least one other signal of a frequency similar to that of said wanted signal to provide a measure of interference provided by said at least one other signal.

BRIEF DESCRIPTION OF DRAWINGS

For a better understanding of the present invention and as to how the same may be carried into effect, reference will now be made by way of example to the accompanying drawings in which.

DETAILED DESCRIPTION OF EMBODIMENTS OF THE PRESENT INVENTION

Figure 1:
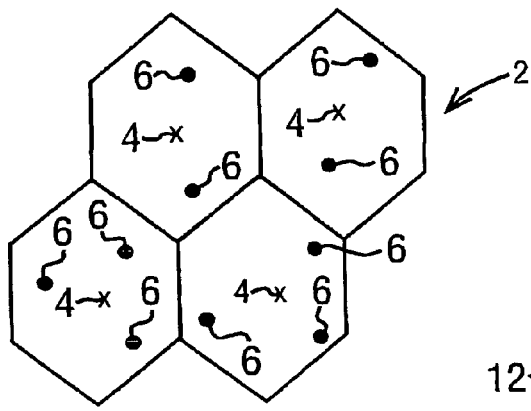
FIG. 1 shows the layout of a typical cell network.

Reference is now made to FIG. 1 which shows part of a cellular telecommunications network 2 in which embodiments of the present invention can be implemented. The area covered by the network is divided into a plurality of cells, four of which are shown in FIG. 1. Each cell has associated therewith a base transceiver station 4. The base transceiver stations 4 are arranged to communicate with mobile terminals 6 located in the cell associated with a given base station 4.

Embodiments of the present invention are primarily related to the frequency reuse of traffic channels. However embodiments of the invention are alternatively or additionally applicable to the reuse of control channels such as the BCCH channel or any other beacon or pilot channel. In the case of GSM systems, some channels may be lost for BCCH duty.

Figure 2:
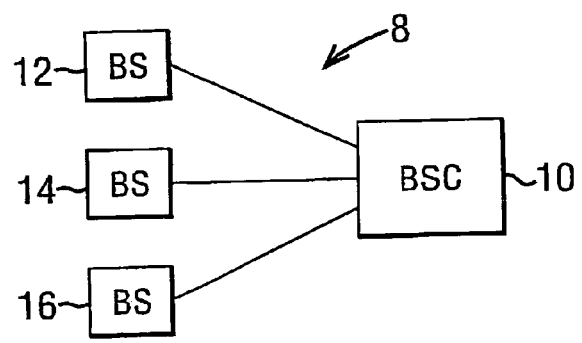
FIG. 2 shows how base stations and a base station controller are connected.

The base stations are controlled by a base station controller, as shown in FIG. 2. Three base stations 12,14,16 are all allocated a particular frequency set at which they operate. Each base station 12,14,16 is also allocated an identity number (base station identity code BSIC) with which it can be identified. The base station controller 10 is arranged such that it can communicate with the plurality of base stations 12,14,16. The base station controller 10 controls the frequency sets used by the respective base station 12,14,16 so that local area network planning can be achieved. In FIG. 2, three base stations are shown as being connected to the base station controller. More or less than three base stations may be connected to the base station controller. In a network, more than one base station controller is provided and these base station controllers communicate via another network element (not shown).

Figure 3:
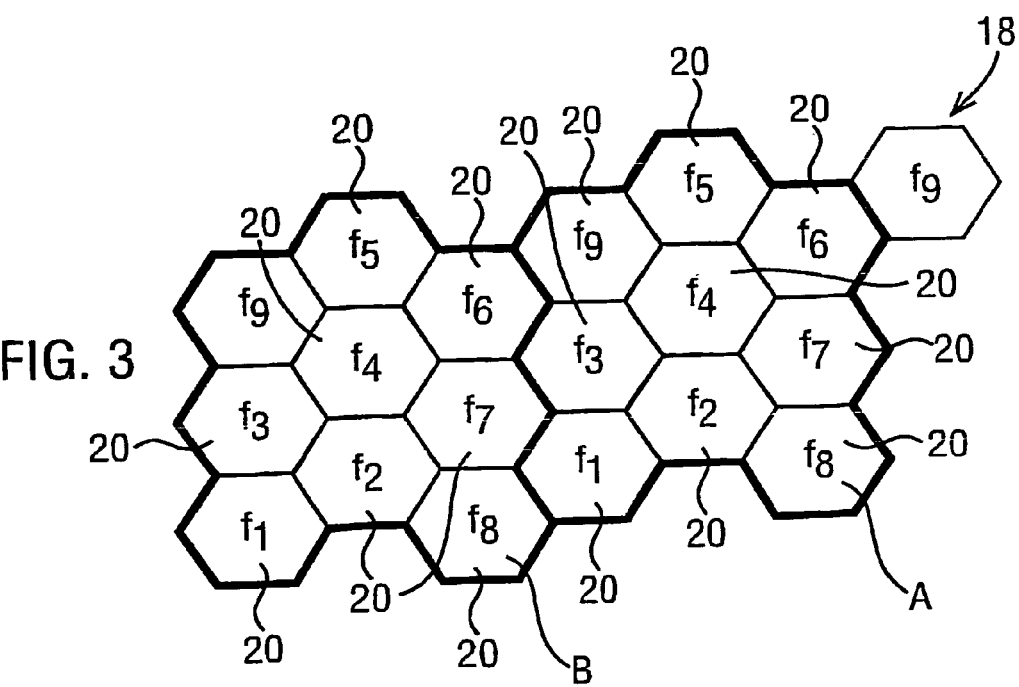
FIG. 3 shows the layout of a typical cell network with a frequency reuse of nine.

Referring now to FIG. 3 which shows a typical cell network 18 having a frequency reuse of nine. The network 18 is composed of a number of individual cells 20. Each cell has been assigned a set of frequency channels for communications between the mobile stations and the respective base station. A frequency set therefore comprises the frequencies with which the base station communicates with the mobile station and the frequencies with which the mobile station communicates with the base station. In FIG. 3 each frequency set f1, f2, f3, ... , f9 is composed of one or more of the receive frequency channels F1, F2, F3, ... , F125 and the associated transmit frequencies. No frequency appears in more than one set. The frequency sets f1, f2, f3, ... , f9 are arranged in respective clusters A and B such that there are a number of adjacent cells, in this particular case nine cells, which contain the different frequency sets. These clusters are repeated to cover the network.

Figure 4:
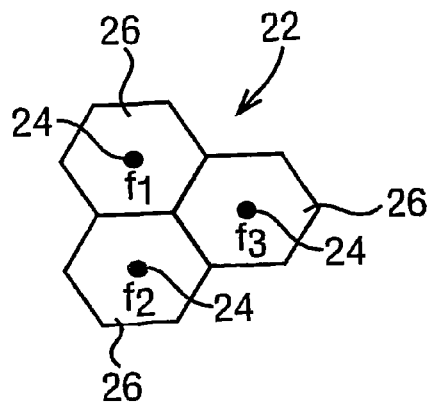
FIG. 4 shows a three site cluster comprising three base stations.

In FIG. 4 there is shown a three site cluster 22 with a frequency reuse of three. The three frequency sets f1, f2 and f3 are allocated to the respective cell sites 24. Again no frequency appears in more than one set. The frequency channel sets f1, f2 and f3 may comprise all the available 125 frequency channels.

Figure 5:
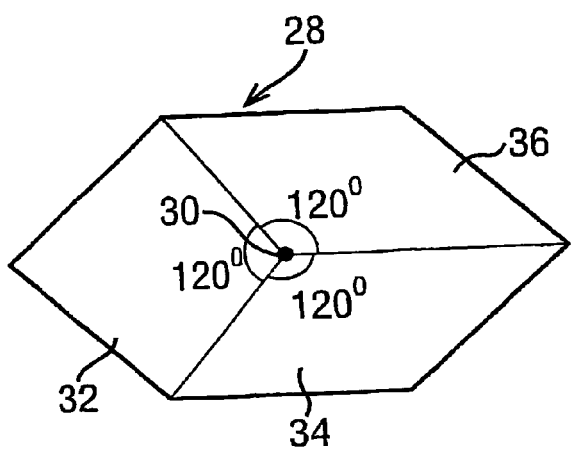
FIG. 5 shows a cell with three sectors and one base station.

FIG. 5 shows a single base station site 28 which has been divided into three sectors. Each sector operates using a different frequency channel set, more specifically sector one 32 operates using frequency channel set f1, sector two 34 operates using frequency channel set f2 and sector three 36 operates using frequency channel set f3. This sectorisation is achieved by the base station 30 using directional antennas positioned at, in this case, 120 degrees around the base station. The base station 30 can in practice be regarded as three base stations, although some components will be common to all three sectors. It is possible that there may be more or less than three sectors in a cell. There may only be three frequency sets f1, f2 and f3 with each base station site defining a cluster. Alternatively, the base station site may form part of a cluster with one or more other sites. This is shown in FIG. 6.

Figure 6:
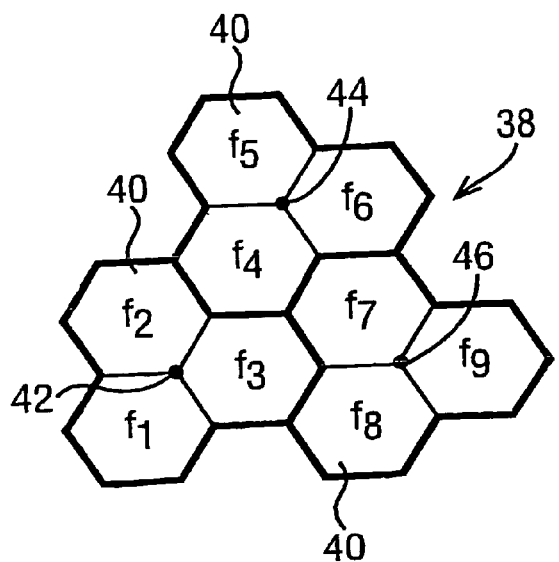
FIG. 6 shows a 3/9 cell cluster comprising three base stations.

FIG. 6 shows a nine sector cluster 38 comprising three base station sites. Each sector 40 of each base station site is arranged such that it operates using a different frequency set. Each base station site 42, 44, 46 is arranged such that it controls three of the sectors 40. The first base station site 42 uses the frequency channel sets f1, f2, f3. A second base station site 44 uses the frequency channel sets f4, f5, f6. A third base station site 46 uses the frequency channel set f7, f8, f9. Again, no frequency appears in more than one set. One frequency set is allocated to each site. This means that there is a frequency reuse of nine in the cluster.

This kind of arrangement is useful in areas where there is a high density of subscribers. These sectorised cells are useful in heavily subscribed areas because a single base station site serves, in this case, three sector cells. Each one of these sector cells has associated with it one of the nine frequency channel sets f1, f2, ... , f9 and so therefore there is greater potential to service an increased cluster traffic density. There is an increase in cluster traffic density because there is effectively nine small cells where originally there was only three cells, each one assigned to a different frequency channel set.

This kind of arrangement is an example of a 3/9 cell cluster because there are three base station sites controlling nine cells within a reuse cluster.

Figure 7:
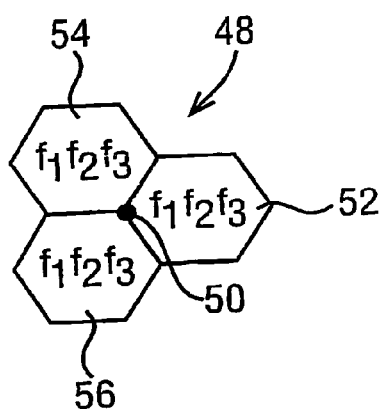
FIG. 7 shows a 1/1 reuse scheme.

FIG. 7 shows an example of a 1/1 reuse scheme. A base station site 50 is arranged to operate in three sectors 48. These sectors 52,54,56 are arranged so that they each operate using different frequency channel sets f1, f2, f3. At substantially the same time, each sector 52,54,56 is arranged to operate using a different one of the frequency channels. In other words a first sector 52 can operate using, say, frequency channel set f1. A second sector 54 can operate using either f2 or f3 and a third sector 56 would operate using the frequency channel set which is not operational in either sector one 52 or sector two 54. This means that all three channel sets f1, f2, f3 are operational in the three cell sectors 48 at substantially the same time although in each individual sector of the three cell cluster there operates different frequency channel sets at the same time. The advantage of 1/1 schemes is that there is an increase in channel traffic density when compared with the previously described methods. This arrangement is particularly useful where there is a very high density of subscribers requesting service at substantially the same time. This kind of arrangement requires that each sector changes the frequency channel set with which it operates at substantially the same time so a synchronous network is required to ensure that this criteria is met.

Two types of interference occur in a cellular network. The first type is co-channel interference. Co-channel interference is due to the fact that a cell or cell sector works on a particular frequency channel at any one time and a cell, which may be a non-adjacent cell, works at the same frequency at the same time. This means that because the first cell operates at the same frequency as the second cell, the first cell produces co-channel interference in the second cell. Co channel interference is a greater problem with smaller cells and/or reuse clusters.

The second type of interference is adjacent channel interference (ACI). As the number of mobile subscribers increase, the density of users requesting service in a particular cell is likely to increase. This means that there needs to be an increase in the number of channels allocated to a particular cell. This in turn means that cells operating using adjacent-frequency channels also tend to be positioned closer together. In other words, cells which use frequencies adjacent to each other are placed a shorter distance apart when there is a higher demand for service at substantially the same time. This means therefore that there tends to be a stronger signal received at a particular base station which is at a frequency adjacent to the frequency channel at which the base station is operating. ACI also tends to limit the channel capacity of a network although at a much reduced level compared to CCI.

Figure 8:
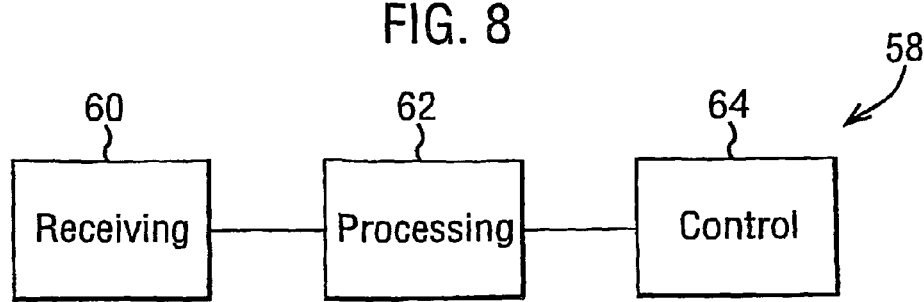
FIG. 8 shows a block diagram of a base transceiver station.

FIG. 8 shows how a receiving part 60, a processing part 62 and a control part 64 interact in a base station as described in the preferred embodiment of the present invention. The receiving part 60 of the base station is designed to receive a signal which may contain several frequencies at substantially the same time. This may comprise a form of antenna or other suitable means of reception. The base station will then process the received signals, using the processing section 62, in a manner which will allow not only the wanted signal to be extracted from the received signal and processed to allow communication to and from mobile stations but will also allow the adjacent channel interference to be measured. The processing section 62 will pass this measured interference level, and other data to the control section 64 which will control the base station so that it acts in response to the measured interference level. The processing section 62 will also relay the measured data back to a base station controller which will receive such data from a plurality of base stations and will then control the frequency allocation as on the basis of the information on the interference levels received from the base stations.

Figure 9:
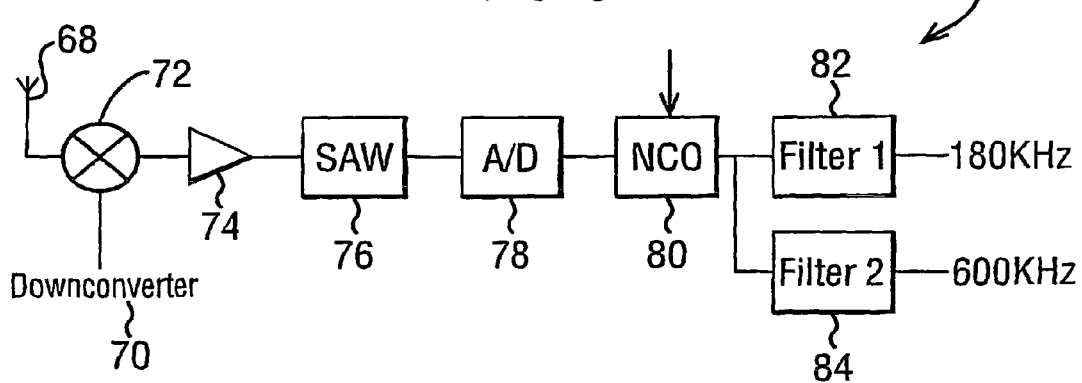
FIG. 9 shows a base transceiver station embodying the present invention.

FIG. 9 shows the arrangement of FIG. 8 in more detail. A base station receiver 66 has a receiving antenna 68 arranged in such a way that it can receive signals carried by M different frequency carriers at the same time. Each of the M different carriers is at a radio frequency. M may be equal to N. Each carrier frequency channel has a bandwidth of 200 kHz. Adjacent carrier frequencies $F_1, F_2, \ldots F_M$ are spaced apart by at least 600 KHz. The M different carriers and the signals carried thereby received by the antenna 68.

Figure 10:
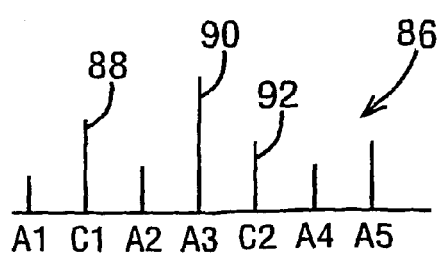
FIG. 10 shows a typical received signal at a base station.

FIG. 10 shows a signal 86 which may be received at the antenna 68. The signal 86 received by the antenna 68 comprises a number of different frequencies all received at substantially the same time. A first wanted carrier 88 is received substantially at the same as two adjacent carriers A1 and A2. A second wanted carrier 92 is received at substantially the same time as two adjacent carriers A3 and A4. The wanted carriers C1 and C2 received in the signal 86 may or may not have a larger signal strength than the received unwanted carriers A1 to A4. Signals A1, A2, A3 and A4 are intended for a different base station and are adjacent in frequency to the wanted carriers. By adjacent, it is meant the next frequency channel next to the desired frequency channel. In FIG. 10, the unwanted carrier A3 has a larger amplitude than the second wanted carrier C2 which is adjacent to it. This means that the carrier to interference ratio (CIR) is poor for the second wanted signal C2. The CIR is a measure of received signal quality, the higher the CIR the better the quality of the received signal.

The output of the antenna 68 is connected to the input of a mixer 72 which has attached to its other input a downconverter 70. The downconverter 70 oscillates at a substantially constant frequency The mixer 72 mixes the received input M frequencies from the receiving antenna 68 with the signal produced by the down converter 70 to produce M frequencies which are at lower frequencies than the received signals. The output from the mixer 72 may be at an intermediate frequency or at a base band frequency. The output from the mixer 72 is then amplified by the amplifier 74 which then passes the output signal to a surface acoustic wave (SAW) 76 filter. This filter provides filtering of the input signal so that only the signals of interest, more specifically the wanted signal C1 or C2 and the two adjacent carriers A1 and A2 or A3 and A4, are provided to the components downstream of the SAW filter 76.

Figure 11:
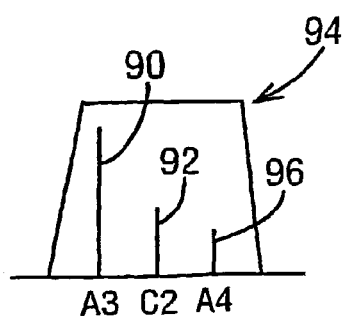
FIG. 11 shows the output from the SAW filter of FIG. 9.

FIG. 11 shows the output 94 of the SAW filter 76 when the frequency of interest is the second wanted carrier C2. As can be seen, the only signals allowed to pass through the SAW filter 76 are the second wanted carrier C2 and the two carriers A3 and A4 adjacent to the second wanted carrier C2. This means that the other signals received by the antenna 68 are filtered out by the SAW filter 76. These signals which are allowed to pass through the SAW filter 76 are passed on to circuitry downstream of the SAW filter 76.

The output of the SAW filter 76 is input to an analogue to digital convertor (ADC) 78. The ADC 78 converts the analogue signal which is output from the SAW filter 76 into a digital representation of the SAW filter 76 output. To implement this, the ADC 78 needs to sample the input signal at a very high frequency which is at least twice the maximum frequency present in the input signal. The output from the ADC 78 is therefore a digital data stream which is a digital representation of the output of the SAW filter 76. The digital representation output from the ADC 78 is input to a numerically controlled oscillator NCO 80 which uses a numerical control signal to alter the frequency at which the NCO 80 oscillates. The NCO 80 is used to convert the digital signal from an intermediate frequency to a base band signal.

The output from the NCO 80 is at a base band frequency. Attached to the output of the NCO 80 is a first band pass filter 82. The first band pass filter 82 is arranged to filter out signals which fall outside the receive band in which the frequency channel of interest resides. The first band pass filter 82 is about 180 kHz wide. The first band pass filter 82 is a narrow band filter which is used to extract the wanted signal. The first band pass filter 82 is arranged so that, in this case, the second wanted signal C2 is allowed to pass through it substantially unattenuated and the remaining signals are filtered out. The adjacent channel signals are removed. Additionally connected to the output of the NCO 80 is a second band pass filter 84. The second band pass filter 84 is arranged to filter out signals which fall outside the receive band in which the frequency channel of interest resides. The second band pass filter is 600 kHz wide, which may be the width of the SAW filter 76. The second band pass filter 84 has a wide enough band pass characteristic so that the wanted channel and the two channels adjacent to the wanted channel are allowed to pass through. The output from the second band pass filter 84 is then passed to digital signal processing apparatus (not shown) to allow the strength of the carriers adjacent to the wanted signal to be measured.

The digital signal processing apparatus calculates the power present in each of the three carriers separately, in this case the second wanted signal C2 and the two carriers adjacent to it A3 and A4, which are presented to it. Once the signal strength of each of the three carriers has been measured, the DSP apparatus compares the signal strength of the second wanted carrier C2 with the first adjacent signal A3 and then compares the second wanted signal C2 with the second adjacent signal A3. From these comparisons the adjacent channel interference and the CIR for the wanted signal C2 is calculated. Although only the channels adjacent to the wanted signals are described hereinbefore it should be appreciated that other unwanted signals or combinations of the unwanted signals may also be measured and processed in a similar manner. For examples, non immediately adjacent channels could be taken into account.

Once the CIR has been calculated, the CIR is passed to a base station controller (BSC). As described in FIG. 2, the base station controller controls a plurality of base stations and makes a decision based on the CIR as to how each individual base station should be controlled and in particular the frequencies it should use. One way in which the BSC can act on the adjacent channel interference is if a high adjacent carrier signal strength is detected, in other words there is a low CTR. If this occurs then the BSC can allocate a different frequency channel to the mobile station, hand control of the mobile station to a more suitable base station within the BSCs control or change the frequencies used in an adjacent cell.

Another feature of the ACI measurement is that it indicates a good propagation path between the mobile station and the base station. This means that this data can be used to construct information about the propagation environment around the base station. This is useful for determining the radio environment and can also be used in network planning.

A further feature of the adjacent channel interference measurement is that it allows the BSC to decide what type of information is allocated to each particular frequency channel. For example, in FIG. 10 there is shown a typically received signal. As can be seen, the first wanted carrier C1 has a higher CIR than the second wanted carrier C2. This means that the quality of the first wanted carrier is better than the quality of the second wanted carrier. The BSC could therefore allocate a telephone voice channel to the second wanted carrier C2 and a data channel to the first wanted carrier C1. This is because the quality of channel required to be a data channel is much greater than that required for a telephone voice channel. This effectively allows the BSC to intelligently allocate different methods of communication to more suitable frequency channels.

In a 1/1 synchronised scheme an adjacent or neighboring cell will be operating at a particular frequency and at some point during the hopping sequence, the serving cell will then operate at the same frequency as the adjacent or neighboring cell. This will consequently lead to interference. In a 1/1 scheme as described hereinbefore, measurement of the adjacent channel interference can allow the base station controller to calculate which mobiles are causing interference and which are being interfered with. The base station controller can consequently instruct a base station site to alter the frequency hopping sequence it uses to reduce this interference. Furthermore it can also force handovers of mobile stations to other base station sites to mitigate the problem.

Whilst embodiments of the present invention have been described in relation to a GSM system, embodiments of the present invention can be used with any other suitable standard using time division multiple access (TDMA), spread spectrum systems such as code division multiple access (CDMA), frequency division multiple access (FDMA), space division multiple access (SDMA) and hybrids of any of these systems.

Embodiments of the present invention have been described in the context of a receiver for a base transceiver station. However, embodiments of the present invention can be used in any other suitable receiver such as in a mobile station as well as other types of receiver which are not used in cellular networks but which are arranged to receive a number of signals, at different frequencies, at the same time. Where the arrangement is included in mobile stations, the mobile stations may report back their readings to the base station controller via the respective base station. Other applications may include multipower control for transmitters.

What is claimed is:

1. A telecommunications network comprising: at least one network element; a network planner for controlling the frequencies used by at least one of said network elements, said network planner being arranged to use information provided by at least one of said network elements;

wherein said at least one network element for providing said information comprises;

means for receiving a first plurality of signals at different frequencies at substantially the same time, and means for comparing a wanted signal from said first plurality of signals at a first frequency with at least one other signal from said first plurality of signals at a frequency adjacent to that of said wanted signal to provide a measure of interference provided by said at least one other signal, and the network planner is arranged to control the frequencies used by at least one network element in accordance with said information.

2. A network as claimed in claim 1, wherein comparing means comprises first filter means for removing the other signals except the frequency of interest.

3. A network as claimed in claim 2, wherein the comparing means comprises second filter means for removing all other signals except the frequency of interest and the at least one other signal at a frequency adjacent to that of said wanted signal.

4. A network as claimed in claim 3, wherein said first and second filter means are in parallel.

5. A network as claimed in claim 1, wherein the comparing means comprises means for isolating the wanted frequency and at least one other signal at a frequency adjacent to that of said wanted signal from at least some of the other received signals.

6. A network as claimed in claim 5, wherein said isolating means comprises a filter.

7. A network as claimed in claim 6, wherein said isolating means comprises a SAW filter.

8. A network as claimed in claim 1, where two signals at adjacent frequencies are considered by said comparing means, one on either side of the frequency of said wanted signal.

9. A network as claimed in claim 1, wherein said measure of interference is a carrier to a signal ratio.

10. A network as claimed in claim 1, wherein said information relates to the interference at said network element between at least one desired signal and at least one unwanted signal at a frequency adjacent to that of said wanted signal.

11. A method comprising the steps of:
 receiving a first plurality of signals at different frequencies at substantially the same time;
 comparing a wanted signal from said first plurality of signals at a first frequency with at least one other signal from said first plurality of signals of a frequency adjacent to that of said wanted signal to provide a measure of interference provided by said at least one other signal;
 providing said measure of interference to a network planner; and
 using said measure of interference to control the frequencies used in accordance with said measure of interference.

12. A network as claimed in claim 1, wherein said network planner is a base station controller.

13. A network as claimed in claim 1, wherein said network element comprises a base station.

* * * * *